Patented Nov. 17, 1953

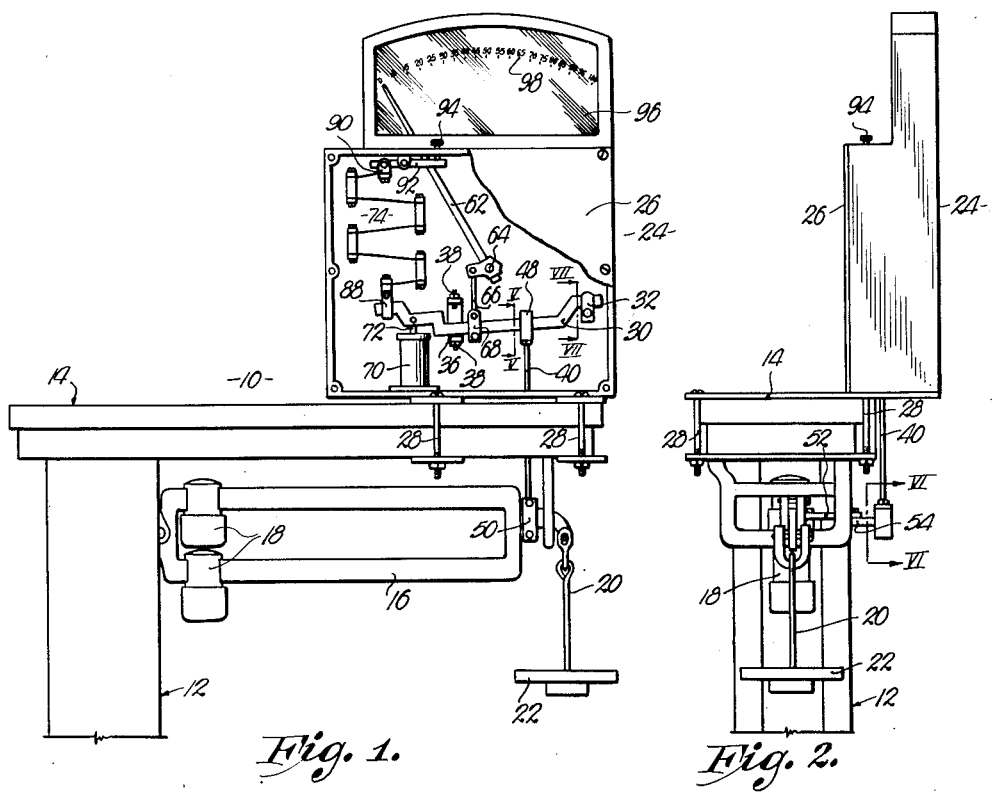

2,659,594

UNITED STATES PATENT OFFICE 2,659,594

TRANSLATING ASSEMBLY FOR BEAM-TYPE WEIGHING SCALE

Edwin J. Eisner, Kansas City, Mo.

Application May 28, 1951, Serial No. 228,597

4 Claims. (Cl. 265—59)

This invention relates to weighing instruments and has for its primary object the conversion of a lever-type scale that includes a swingable scale beam into a self-indicating instrument, providing through suitable recording means a visible indication of the weight of a load placed upon the platform of the scale and eliminating further manipulation on the part of the operator.

It is the most important object of the present invention to provide an attachment for beam scales to render the same self-indicating and predicated upon a modified form of spring balance wherein the spring aids in the movement of an indicator hand or pointer when a load is placed upon the scales rather than oppose the movement of the scale beam under influence of the load as is common in ordinary spring balance mechanisms.

Another important object of the present invention is to provide a special type of spring assembly heretofore deemed impractical in devices of this kind but so formed and arranged as to present many advantages over the conventional coil or helix spring used almost exclusively in spring balance scales.

A further object of this invention is the provision of an attachment that includes a counterbeam devoid of the sliding poise but having attachment with an oscillating indicator and with the spring assembly above mentioned, all for the purpose of providing an accurate indication of the weight of a load placed on the scales.

Other objects include the way in which the aforesaid spring assembly includes a plurality of superimposed, elongated leaf springs joined together at the ends thereof; the way in which the tension of the spring assembly is made adjustable; the manner of providing adjustable stops for the swingable counterpoise; the way in which all bearing points are made either knife-edged or pointed to further provide for extreme accuracy; and many other objects including details of construction all of which will be made clear or become apparent as the following specification progresses.

In the drawing:

Figure 1 is a fragmentary, elevational view of an ordinary platform-type scale illustrating the novel translating assembly attached thereto, parts being broken away to reveal details of construction.

Fig. 2 is an end elevational view thereof.

Fig. 3 is an elevational view of the spring assembly entirely removed from the attachment.

Fig. 4 is a cross-sectional view of the spring assembly taken on line IV—IV of Fig. 3.

Fig. 5 is an enlarged, fragmentary, detailed, cross-sectional view taken on line IV—IV of Fig. 1.

Fig. 6 is a fragmentary, detailed, cross-sectional view taken on line VI—VI of Fig. 2; and Fig. 7 is an enlarged, fragmentary, detailed, cross-sectional view taken on line VII—VII of Fig. 1.

A conventional platform-type scale is shown in part in Figs. 1 and 2 of the drawing and broadly designated by the numeral 10. A framework 12 provided with a horizontal portion 14, supports a swingable scale beam 16, the type chosen for illustration being provided with a pair of balance weights or sliding poises 18 that are normally disposed in the inoperative position shown in Fig. 1 of the drawing when the attachment hereof is placed in use.

The dual portions of beam 16 are each provided with graduations not shown, that cooperate with the poises 18 in determining the weight of a load on the platform (not shown) of scales 10. A weight support 20 on the outermost free end of the beam 16 is used in connection with the present invention for receiving a single loose weight 22.

The translating assembly, broadly designated by the numeral 24, is shown supported in its entirety by the horizontal portion 14 of framework 12 and includes a hollow body 26 that is releasably secured to the portion 14 by suitable clamps 28. An elongated counterbeam 30 is swingably mounted at one end thereof within the hollow body 26 through the medium of a U-shaped bracket 32 secured to the inner face of one wall of the body 26, together with a cross pin 34 on the counterbeam 30 having a knife-edge as is common in this field. The limits of swinging movement of the counterbeam 30 are defined by a U-shaped bracket 36 that partially embraces the counterbeam 30 intermediate the ends thereof and is provided with setscrews and lock nuts 38 in opposed relationship on the bracket 36 whereby the limits of swinging movement of beam 30 may be adjusted.

Counterbeam 30 is connected with the scale beam 16 through the medium of an elongated, vertical rod 40. A releasable clamp 42 on the counterbeam 30 may be adjusted as desired along the length thereof and is provided with a pointed pin 44 on its uppermost face for receiving a complementary cavity 46 in a loop 48 that circumscribes the clamp 42 and is secured directly to the uppermost end of the rod 40. A clamp 50 releasably secured to the scale beam 16 is provided with a laterally extending strap 52 having a corresponding strap 54 in lapped relationship thereto that is provided with a depending pointed pin 56. Straps 52 and 54 are provided with elongated, bolt-receiving slots to the end that the distance between pin 56 and the beam 16 may be adjusted as desired.

A loop 58 similar to loop 48, secured to the lowermost end of rod 40, receives the pin 56 through the medium of a cavity 60 formed in loop 58. An elongated, oscillating indicator hand or pointer 62 is pivotally mounted for swinging movement on a horizontal axis within the body 26 as at 64.

Hand 62 is joined with the counterbeam 30 by means of a short rod 66 pivotally connected to the hand 62 at its uppermost end and to a bracket 68 at its lower end, the bracket 68 being adjustably clamped to the counterbeam 30 between clamp 42 and bracket 36.

A dash-pot 70 for preventing undue vibration of beams 16 and 30 and the oscillating hand 62 is secured to the bottom wall of body 26 and has its piston stem 72 pivotally secured to the counterbeam 30 adjacent that end thereof opposite to the pivot pin 34. The last mentioned end of beam 30 is joined with a spring assembly broadly designated by the numeral 74 that includes a plurality of superimposed, spaced leaf springs 76. Springs 76 are each joined at one end thereof with an overlying spring and at the opposite end with an underlying spring through the medium of spacers 78 and nut and bolt means 80.

The lengths of lowermost spring 82 and uppermost spring 84 are substantially half that of the springs 76 and extend in opposite directions, terminating at their innermost ends within a substantially vertical plane. A perforated block 86 pivotally connects spring 82 with a clamp 88 on counterbeam 30 and a similar perforated block 90 on the spring 84 pivotally connects the assembly 74 with a short swingable arm 92 mounted on the uppermost wall of the body 26. The tension of the spring assembly 74 may be adjusted by means of a setscrew 94 bearing against the arm 92 on that side of its pivotal connection opposite to the perforated block 90.

A dial 96 on body 26 is provided with graduated indicia 98 that are curved as illustrated to correspond to the radius of pointer 62 and by manipulation of setscrew 94, the tension of spring assembly 74 may be adjusted to correspond with the graduations 98.

It is seen from the foregoing that swinging movement of the counterbeam 30 corresponds to such movement on the part of the scale beam 16 under influence of the weight of a load on the scales 10. Such weight however, does not work against the spring assembly 74 however, as is common in various types of spring scales. Instead, as soon as the beam 16 and the counterbeam 30 rise, the spring assembly 74 aids the hand 62 in its swinging movement across the dial 96. In other words, when the beams 16 and 30 are at the lowermost ends of their paths of travel, the spring assembly 74 is fully flexed or loaded as illustrated by dotted lines in Fig. 3 of the drawing, whereas when the beams 16 and 30 are at the uppermost ends of their paths of travel and the hand 62 is at the extreme right hand end of dial 96, the spring assembly 74 is in the condition illustrated by full lines in Fig. 3 of the drawing. The individual leaf springs 76, 82 and 84 flex evenly and therefore accurately determine the weight of the load by extension or compression which is in turn registered on the dial 96 by the pointer 62.

A spring assembly 74 such as is included in the present invention is compact and symmetrical and has a capacity for uniformity of strain that is not possessed by various other types of spring means commonly employed in this field.

It is obvious further to those skilled in this field that the problems normally presented in helical springs including torsion or twisting are not presented through use of an assembly such as herein employed and it is therefore obvious that a more accurate and positive indication of the weight of the load is presented on the dial 96 than has heretofore been made possible through various other types of construction. It is clear however, that within the principles of this invention, a gravity weight indicator, coil spring, or cam and steel tape arrangement may be utilized with varying degrees of success and accuracy.

Accordingly, while details of construction may be varied over those chosen for illustration, it is desired to be limited only by the spirit of the invention as defined by the scope of the appended claims.

Having thus described the invention what is claimed as new and desired to be secured by Letters Patent is:

1. In an indicating attachment for scales, a swingable scale beam; a swingable counterbeam connected with said scale beam for swinging movement thereby; a swingable indicator hand connected with said counterbeam for swinging movement thereby; a spring assembly joined with said counterbeam for holding the latter biased in its direction of swinging movement under influence of the weight of an article being weighed on the scales, said assembly including a number of superimposed, flat springs, one spring being joined to the counterbeam; and means for supporting a second of the springs, each of the remaining springs having one end thereof joined with an overlying spring and its opposite end joined with an underlying spring.

2. In an indicating attachment for scales, a swingable scale beam; a swingable counterbeam connected with said scale beam for swinging movement thereby; a swingable indicator hand connected with said counterbeam for swinging movement thereby; and a spring assembly joined with said counterbeam for holding the latter biased in its direction of swinging movement under influence of the weight of an article being weighed on the scales, said assembly including a number of superimposed, flat springs each having one end thereof joined with an overlying spring and its opposite end joined with an underlying spring, there being a lowermost spring having one end joined to said counterbeam and an uppermost spring having one end thereof rigidly mounted.

3. In an indicating attachment for scales, a swingable scale beam; a swingable counterbeam connected with said scale beam for swinging movement thereby; a swingable indicator hand connected with said counterbeam for swinging movement thereby; and a spring assembly joined with said counterbeam for holding the latter biased in its direction of swinging movement under influence of the weight of an article being weighed on the scales, said assembly including a number of superimposed, flat springs each having one end thereof joined with an overlying spring and its opposite end joined with an underlying spring, there being a lowermost spring having one end joined to said counterbeam and an uppermost spring having one end thereof rigidly mounted, the points of joinder of said lowermost and said uppermost springs being substantially within a common vertical plane intersecting medially the remaining springs.

4. In an indicating attachment for scales, a swingable scale beam; a swingable counterbeam connected with said scale beam for swinging movement thereby; a swingable indicator hand connected with said counterbeam for swinging movement thereby; a spring assembly joined with said counterbeam for holding the latter biased in its direction of swinging movement under influence of the weight of an article being weighed on the scales, said assembly including a number of superimposed, flat springs each having one end thereof joined with an overlying spring and its opposite end joined with an underlying spring, there being a lowermost spring having one end joined to said counterbeam and an uppermost spring having one end thereof rigidly mounted; and means forming said rigid mounting for varying the tension of said assembly on the counterweight.

EDWIN J. EISNER.

References Cited in the file of this patent

UNITED STATES PATENTS

| Number | Name | Date |
|---|---|---|
| 642,321 | Gilfillan | Jan. 30, 1900 |
| 1,072,018 | McFarlane | Sept. 2, 1913 |
| 1,765,691 | Moser | June 24, 1930 |

FOREIGN PATENTS

| Number | Country | Date |
|---|---|---|
| 598,580 | Germany | June 13, 1934 |